United States Patent [19]

Sugiyama et al.

[11] 3,856,945

[45] Dec. 24, 1974

[54] METHOD OF REDUCING SERUM CHOLESTEROL LEVEL WITH EXTRACT OF KONJAC MANNAN

[75] Inventors: Noboru Sugiyama, Tokyo; Hideo Shimahara, Mihara, both of Japan

[73] Assignee: Kabushiki Kaisha Shimizu Manzo Shoten, Hiroshima-ken, Japan

[22] Filed: Sept. 9, 1971

[21] Appl. No.: 179,201

[30] Foreign Application Priority Data
Dec. 30, 1970 Japan................................ 45-12828

[52] U.S. Cl................................ 424/195, 424/180
[51] Int. Cl............................................ A61k 27/14
[58] Field of Search............................ 424/195, 180

[56] References Cited
UNITED STATES PATENTS
3,148,114   9/1964   Fahrenbach et al................ 424/180

OTHER PUBLICATIONS
Chemical Abstracts: Vol. 60: 4378g (1969); Vol. 57: 16927h (1962); Vol. 46: 3009i (1952); Vol. 36: 65602 (1942); Vol. 32: 19502 (1938).

Chemical Abstracts: Vol. 61: 8788g; Vol. 47: 4495e; Vol. 47: 5468h.

Chemical Abstracts: Vol. 36: 70065.

*Primary Examiner*—Albert T. Meyers
*Assistant Examiner*—Donald B. Moyer
*Attorney, Agent, or Firm*—William J. Daniel

[57] ABSTRACT

Water-soluble konjac mannan capable of undergoing gelation when heated in an aqueous alkaline solution is obtained by extracting the ground tuber of the konjac plant with water, separating insoluble matter, dialyzing the solids-free liquid against water and then lyophilizing the dialyzed liquid to remove water. This konjac mannan has utility as a food and exhibits a depressant effect on the serum cholesterol value in warm-blooded animals.

1 Claim, No Drawings

METHOD OF REDUCING SERUM CHOLESTEROL LEVEL WITH EXTRACT OF KONJAC MANNAN

This invention relates to a substantially pure, water-soluble konjac mannan and to a process for preparing same. This invention is also directed to a pharmaceutical composition containing this konjac mannan as an active ingredient as well as to a method of treating warm-blooded animals including humans with the water-soluble konjac mannan to depress the serum cholesterol level.

Konjac (Amorphophalus Konjac C. Koch) is a perennial plant belonging to the family Araceae. "Konnyaku", which is made from the tuber of this plant, has been used traditionally for food in Japan for several hundred years. The predominant component of edible konnyaku is a glucomannan called konjac mannan. Edible konnyaku is made from the konjac flour, which is obtained from the dried tuber of this plant.

Several techniques are known in the art for separating konjac mannan from konjac flour. In one, konjac flour is boiled in water, treated with Fehling's solution to convert the mannan to its copper complex, and the latter is decomposed again into the mannan after purification, as disclosed in J. Agr. Chem. Soc. Japan, 6, 991-995 (1930). In another, konjac flour is extracted with water, impurities are removed by precipitating with ethanol and redissolving the precipitate in water several times, and drying the precipitate finally obtained to obtain pure konjac mannan, as disclosed in Bull. Chem. Soc. Japan, 49, 298-322 (1927).

However, konjac mannan obtained by these methods is no longer soluble in water and is not able to form a konjac gel. This is probably due to a kind of denaturation during the processing as has been observed for amylose in alkaline solution, in J. Amer. Chem. Soc., 76, 4595 (1954).

As the result of research on a method of separating konjac mannan in substantially pure form without serious loss of its valuable natural properties, it has been found that a substantially pure, water-soluble konjac mannan can be obtained by extracting the power of the dried tuber of konjac (Amorphophalus Konjac) with water, removing insoluble materials from the extract, dialyzing it against water and then subjecting the liquid material remaining after such dialysis to lyophilization or freeze-drying.

The water-soluble konjac mannan thus obtained is useful medicinally since it has been found to have depressing activity on the serum cholesterol level. Since water-insoluble konjac mannan prepared by conventional methods has no such pharmacological activity, it is quite surprising that the water-soluble konjac mannan prepared by the process described above has a lowering activity on the serum cholesterol level.

Thus, one object of this invention is to provide a substantially pure, water-soluble konjac mannan as a new product.

Another object of this invention is a pharmaceutical composition containing this substantially pure, water-soluble konjac mannan as an active ingredient.

Still another object of this invention is a method of medically treating warm-blooded animals having an elevated serum cholesterol level due, for instance, to hypertensive symptoms, wherein an effective dose of the substantially pure, water-soluble konjac mannan is administered to the animals.

These and other objects of this invention will become apparent as the description proceeds.

According to the process of this invention, konjac flour is mixed with water under agitation to make a colloidal solution and the resulting solution is separated from insoluble materials by filtration, centrifugal separation or other suitable procedures, then subjected to dialysis treatment and finally to lyophilization to yield substantially pure konjac mannan.

The konjac flour used as the starting material in this invention is generally prepared either by crushing into fine particles the dried tubers of a plant which belongs to the genus Colacacia, preferable Amorphophallus Konjac C. Koch, or by removing starch, fiber, protein, etc., and ethanol-soluble materials from a slurry of ground tubers of the stated type. A commercially available konjac flour sold for the production of edible konnyaku is also useful as a starting material without further preparatory treatment.

A preferred embodiment of the process of this invention involves stirring one volume of the konjac flour with 10–200 volumes of water or grinding one part by weight of raw tuber with 10–100 parts by weight of water, whereby the water-soluble components of the konjac flour, such as konjac mannan, lower molecular weight impurities and inorganic salts, are dissolved in the water while the water-insoluble components, such as starch particles, epidermis of tuber and fibrous materials, are precipitated. The insoluble components are readily removed by filtration, centrifugal separation or any of the other known conventional methods. The resulting aqueous colloidal solution is then dialyzed by the usualy methods, for example, through a semipermeable membrane against tap water for 24–48 hours. By this treatment, the water-soluble impurities and inorganic materials contaminating the konjac mannan are removed almost completely.

Finally, removal of water from the resulting solution by lyophilization or freeze-drying under ordinary conditions leaves a substantially pure, water-soluble konjac mannan as a purely white, cotton-like material, which exhibits the natural properties of konjac mannan, i.e. ready solubility in water and capability of forming konnyaku when heated in the form of an aqueous colloidal solution with alkali. In contrast, the konjac mannans prepared by known conventional methods substantially lose these natural properties. Thus, the material of the invention is useful as a food, i.e. in the preparation of konnyaku.

The conditions used for lyophilization are not critical and can vary according to the accepted practice in that art. Temperature in the range of −75°–0°C and pressures in the range of 0.001–0.1 mmHg are acceptable. The lyophilization need not be carried to substantial dryness if the material can by more readily mixed and/or used in the form of a concentrated solution.

The substantially pure, water-soluble konjac mannan prepared by the present process is a new product not heretofore identified in the literature and has been found to exhibit a strong serum cholesterol level depressing activity, when administered to warm-blooded animals, such as humans, cattle and domestic fowl and the like. Accordingly, this substance can be used effectively to reduce the serum cholesterol value in the medical treatment of various diseases, such as hypertension in humans and arterioscolerosis of poultry, in which a high serum cholesterol level is implicated as a causative or aggravating factor.

The substantially pure, water-soluble konjac mannan may be administered as such, or, if desirable, in the form of a mixture with any carrier conventially used for internal medicaments. When administered to cattle or domestic fowl, the konjac mannan is advantageously incorporated into their feed. The dose varies according to the sort of animals but is generally administered every day within the range from 0.1 g. to 10 g. in several portions per kilogram of body weight.

Useful as pharmaceutically acceptable carriers are glucose, lactose, gum arabic, gelatin, mannitol, starch paste, magnesium trisilicate, talc, cone starch, potato starch, keratin, colloidal silica, etc.

The pharmaceutical composition of this invention may be in any desired form, e.g. powder, tablet, capsule, solution, etc.

This invention will be understood more in detail by reference to the following examples.

EXAMPLE 1

A colloidal solution was prepared by dissolving 0.5 g. of a commercially available konjac flour in 100 ml. of water. After standing for 2 hours, the solution was filtered through a 150-mesh nylon filter cloth and then through a glass-filter (3G4) with suction to remove the insoluble materials completely. 50 milliliters of the clear filtrate was packed in a cellophane tube and dialyzed against distilled water for 48 hours. The solution remaining after this treatment was transferred to a well-cleaned Schale and lyophilized at $-20°C$. and 0.01mm pressure for about 30 hours in a usual manner. Purely white, cotton-like konjac mannan (0.4 grams) was thus prepared. Anal. Calcd. for $(C_6H_{10}O_5 \cdot 1/8H_2O)n$; C, 43,83%; H, 6.28%; Found: D, 43,87%; H, 6.22%; N, trace.

The properties of the konjac mannan thus obtained are shown in the following table where those of the starting flour and of a purified konjac mannan prepared by a known method are also shown for comparison.

TABLE I

|  | Konjac mannan prepared in Example 1 | The starting konjac flour (commercially available) | The konjac mannan prepared by a known method * |
|---|---|---|---|
| Solubility in water | soluble | soluble | insoluble |
| Gelability | retained | retained | lost |
| Solubility in 20% NaOH | insoluble | insoluble | soluble |
| Reducing Power | none | present | none |
| Starch-iodine reaction | negative | positive | negative |

EXAMPLE 2

Fifteen male rats, each weighing about 100 g., of Wister strain were divided into three groups and in each group, one rat was fed a basal (normal) diet, another a hypercholesterolemic diet, and the remaining three rats, three modified versions of the same hypercholesterolemic diet containing commercially available konjac flour, konjac mannan extracted by alcohol from the konjac flour, and konjac mannan of the invention, respectively, at a concentration level of 5% by weight. Fresh food appropriate to each such diet was given ad libitum every morning. At the end of the test period, the animals were anesthetized by intraperitoneal injection of 5% sodium pentobarbital solution. Blood was taken by heart puncture into a heparinized syringe and centrifuged. Individual plasma cholesterol levels were measured by the method of Pearson et al.

The results are shown in the following table as the average values of all groups.

TABLE II

Effect on Hypocholesterolemic Activity of Konjac Mannan in Rats

| Type of Diet | Food intake | B.wt. gain | Plasma cholesterol |
|---|---|---|---|
|  | g/8 days | g/8 days | mg/100 ml |
| Normal Control | 134 ± 5.9 | 56.5 ± 2.7 | 110 ± 4.9 |
| (hypercholesterolemic) | 132 ± 3.2 | 58.0 ± 2.2 | 176 ± 9.7 |
| As in control with 5% starting konjac flour (commercially available) | 115 ± 3.0 | 45.7 ± 2.2 | 162 ± 14.6 |
| As in control with 5% alcohol extract from the konjac flour | 126 ± 2.0 | 56.3 ± 2.1 | 142 ± 10.1 |
| As in control with 5% konjac mannan prepared in Ex. 1 | 128 ± 1.9 | 55.1 ± 3.1 | 133 ± 5.5 |

As is evident from the above table, the konjac mannan prepared according to this invention has an excellent lowering activity on the serum cholesterol level in serum.

According to conventional dialysis procedure, such as is employed in the practice of the invention, the concentration of the solution is usually within the range of 0.1–1.0% by weight, preferably 0.3–1.0% by weight. The dialysis temperature is generally within the range of $0°-30°C$, preferably $3°-10°C$. Above about $30°C$, the solution tends to undergo decay where the circumstances are suitable for growth of microorganisms. Utilizable as semi-permeable membranes are preferably cellulosic materials, especially cellophane marketed by Visking. Membranes of animal origin, for example, urinary bladder membranes, are generally inappropriate for the purpose of this invention for the reason that their pore size is too large. By employing membranes of vegetable origin such as cellophane, particulate impurities are removed to yield a product having a definite size of molecule. The conditions of the dialysis are not especially critical in practice of this invention, however, and any ranges would be suitable here.

As mentioned above, the product of this invention can also be utilized as a food or food additive. Ordinary edible konjac is colored slightly gray brown to light brown and contains insoluble black residual matter. In contrast, the product of this invention is highly purified konjac mannan which is colorless to white and entirely soluble in water. Thus, the product of this invention is useful as purified edible konjac or a food additive, for example, a thickening agent for jelly. As ordinary edible konjac is colored more or less, it has little or no value as a food additive of this type.

What is claimed is:

1. A method for reducing the serum cholesterol levels in hypercholesteremic warm-blooded animals which comprises orally administering a therapeutically effective dose of substantially pure, water-soluble konjac mannan in the range of 0.1–10 g. per kg of animal body weight per day, said konjac mannan being obtained by extracting with water the ground tuber of the konjac plant, dialyzing such extract against water and lyophilizing the thus dialyzed extract to remove water.

* * * * *

UNITED STATES PATENT OFFICE
CERTIFICATE OF CORRECTION

Patent No. 3,856,945          Dated December 24, 1974

Inventor(s) Noboru SUGIYAMA et al

It is certified that error appears in the above-identified patent and that said Letters Patent are hereby corrected as shown below:

In the Heading of the Patent under Foreign Application Priority Data, correct the application No. from "45-12828" to -- 45-128288 --.

Signed and sealed this 11th day of March 1975.

SEAL)
ttest:

UTH C. MASON
ttesting Officer

C. MARSHALL DANN
Commissioner of Patents
and Trademarks